(12) United States Patent
Cho et al.

(10) Patent No.: US 9,854,500 B2
(45) Date of Patent: Dec. 26, 2017

(54) METHOD AND APPARATUS FOR ROUTING DATA IN WIRELESS COMMUNICATION SYSTEM

(71) Applicant: LG ELECTRONICS INC., Seoul (KR)

(72) Inventors: Heejeong Cho, Seoul (KR); Eunjong Lee, Seoul (KR); Hyeyoung Choi, Seoul (KR); Genebeck Hahn, Seoul (KR)

(73) Assignee: LG Electronics Inc., Seoul (KR)

( * ) Notice: Subject to any disclaimer, the term of this patent is extended or adjusted under 35 U.S.C. 154(b) by 211 days.

(21) Appl. No.: 14/765,972

(22) PCT Filed: Feb. 7, 2014

(86) PCT No.: PCT/KR2014/001076
§ 371 (c)(1),
(2) Date: Aug. 5, 2015

(87) PCT Pub. No.: WO2014/126363
PCT Pub. Date: Aug. 21, 2014

(65) Prior Publication Data
US 2015/0373617 A1    Dec. 24, 2015

Related U.S. Application Data

(60) Provisional application No. 61/764,540, filed on Feb. 14, 2013.

(51) Int. Cl.
*H04W 4/00* (2009.01)
*H04W 40/12* (2009.01)
(Continued)

(52) U.S. Cl.
CPC ....... *H04W 40/12* (2013.01); *H04W 28/0268* (2013.01); *H04W 72/0413* (2013.01); *H04W 84/12* (2013.01); *H04W 88/16* (2013.01)

(58) Field of Classification Search
None
See application file for complete search history.

(56) References Cited

U.S. PATENT DOCUMENTS

2006/0182061 A1    8/2006  Naghian
2009/0052437 A1*   2/2009  Taylor ................... H04M 7/006
                                                    370/352
(Continued)

FOREIGN PATENT DOCUMENTS

WO    2011-087223 A2    8/2011

*Primary Examiner* — Steven H Nguyen
*Assistant Examiner* — Rebecca Song
(74) *Attorney, Agent, or Firm* — Dentons US LLP

(57) ABSTRACT

A method and apparatus for routing data in a wireless communication system is provided. In trusted non-3rd generation partnership project (3GPP) access, a wireless local area network (WLAN) access gateway receives parameters, which includes 3GPP core network load information and a core network routing rule, from an entity of a 3GPP system, and routes received UL data based on the received parameters through at least one of the 3GPP system and a non-3GPP system. In un-trusted non-3GPP access, an evolved packet data gateway (ePDG) receives parameters, which includes 3GPP core network load information and a core network routing rule, from an entity of a 3GPP system, and routes received UL data based on the received parameters through at least one of the 3GPP system and a non-3GPP system.

13 Claims, 14 Drawing Sheets

(51) Int. Cl.
*H04W 28/02* (2009.01)
*H04W 72/04* (2009.01)
*H04W 84/12* (2009.01)
*H04W 88/16* (2009.01)

(56) References Cited

U.S. PATENT DOCUMENTS

2010/0091653 A1  4/2010  Koodli et al.
2012/0149376 A1  6/2012  Fang et al.
2012/0263041 A1  10/2012  Giaretta et al.
2012/0324100 A1* 12/2012  Tomici ............... H04L 45/123
                                                709/224
2013/0070596 A1* 3/2013  Yeh ................... H04W 36/0038
                                                370/235

* cited by examiner

FIG. 4

| Frame control | Persistent /ID | Address 1 | Address 2 | Address 3 | Sequence control | Address 4 | Sequence control | QoS control | HT control | Frame body | FCS |

FIG. 13

(a)
| [IP Sec header] source address : UE 1 | [IP Sec header] destination address : ePDG | [IP header] source address : UE 1 | [IP header] destination address : UE 2 | Data payload |

(b)
| [IP header] source address : UE 1 | [IP header] destination address : UE 2 | Data payload |

METHOD AND APPARATUS FOR ROUTING DATA IN WIRELESS COMMUNICATION SYSTEM

This application is a 35 USC §371 National Stage entry of International Application No. PCT/KR2014/001076 filed on Feb. 7, 2014, and claims priority to U.S. Provisional Application No. 61/764,540 filed on Feb. 14, 2013, both of which are hereby incorporated by reference in their entireties as if fully set forth herein.

BACKGROUND OF THE INVENTION

Field of the Invention

The present invention relates to wireless communications, and more specifically, to a method and apparatus for routing data in a wireless communication system.

Related Art

With the recent trend of increasing high-rate data traffic, fifth generation mobile communication technologies are in discussion for their realistic and efficient backup. One of requirements for fifth generation mobile communication technologies is the interworking between heterogeneous wireless communication systems, particularly between a cellular system and a wireless local area network (WLAN) system. The cellular system may be one of a $3^{rd}$ generation partnership project (3GPP) long-term evolution (LTE) system, a 3GPP LTE-A (advanced) system, and an institute of electrical and electronics engineers (IEEE) 802.16 (WiMax, WiBro) system. The WLAN system may be an IEEE 802.11 (Wi-Fi) system. In particular, WLAN is a wireless communication system that is commonly used for various user equipments, and thus, the cellular-WLAN interoperation is a high-priority convergence technique. Offloading by the cellular-WLAN interoperation may increase the coverage and capacity of the cellular system.

The arrival of the ubiquitous environment led to a sharp increase in demand for seamless services anytime, anywhere. The fifth generation mobile communication system may adopt a plurality of radio access technologies (RATs) for always gaining easy access and maintaining efficient performance in any place. In other words, the fifth-generation mobile communication system may use multiple RATs in a converging manner through the interoperation between heterogeneous wireless communication systems. Each entity in the plurality of RATs constituting a fifth-generation mobile communication system may exchange information therebetween, and accordingly, the optimal communication system may be provided to a user in the fifth-generation mobile communication system. Among the plurality of RATs constituting the fifth-generation mobile communication system, a specific RAT may operate as a primary RAT system, and another specific RAT may operate as a secondary RAT system. That is, the primary RAT system may mainly play a role to provide a communication system to a user in the fifth-generation mobile communication system, while the secondary RAT system may assist the primary RAT system. In general, a 3GPP LTE(-A) or IEEE 802.16 cellular system with relatively broad coverage may be a primary RAT system, and a Wi-Fi system with relatively narrower coverage may be a secondary RAT system.

In general, when interworking is performed between the cellular system and the Wi-Fi system, all data flows transmitted/received through a secondary RAT system (e.g., Wi-Fi system) as well as a primary RAT system (e.g., cellular system) always go through a device operating as a local mobility anchor (LMA). A method for routing data efficiently so as to reduce overloads at the device operating as the LMA may be required.

SUMMARY OF THE INVENTION

The present invention provides a method and apparatus for routing data in a wireless communication system. The present invention provides a data routing enhancement method to reduce loads of a core network in interworking of a cellular system and a wireless local area network (WLAN) system. The present invention provides a method for routing data using an entity of a secondary radio access technology (RAT) system according to loads of a primary RAT system.

In an aspect, a method for routing, by a wireless local area network (WLAN) access gateway, data in a wireless communication system including a trusted non-3rd generation partnership project (3GPP) access is provided. The method includes receiving uplink (UL) data, receiving parameters, which include 3GPP core network load information and a core network routing rule, from an entity of a 3GPP system, and routing the UL data based on the received parameters through at least one of the 3GPP system and a non-3GPP system.

The 3GPP core network load information may be included in quality of service (Qos) rules.

The core network routing rule may include a 1-bit indicator indicating whether the UL data is to be transmitted through the 3GPP system or the non-3GPP system, and a transmission ratio indicating a ratio of traffic which is transmitted through the 3GPP system to traffic which is transmitted through the non-3GPP system.

The core network routing rule may be included in routing rules.

The core network routing rule may be mapped with a rule identifier in the routing rules.

The parameters may be received during a gateway control session establishment procedure.

The parameters may be set during an Internet protocol (IP) connectivity access network (CAN) session establishment or modification procedure.

The entity of a 3GPP system may be a packet data network (PDN) gateway (GW).

The method may further include transmitting information on charging to the entity of the 3GPP system.

In another aspect, a method for routing, by an evolved packet data gateway (ePDG), data in a wireless communication system including a un-trusted non-3rd generation partnership project (3GPP) access is provided. The method includes receiving uplink (UL) data through a wireless local area network (WLAN) access gateway, receiving parameters, which include 3GPP core network load information and a core network routing rule, from an entity of a 3GPP system, and routing the UL data based on the received parameters through at least one of the 3GPP system and a non-3GPP system.

The parameters may be received during an initial attachment procedure.

Loads of a core network can be reduced.

BRIEF DESCRIPTION OF THE DRAWINGS

FIG. 4 shows an example of a frame structure of IEEE 802.11.

FIG. 13 shows an example of a frame structure used in a method for routing data in un-trusted non-3GPP access according to an embodiment of the present invention.

DESCRIPTION OF EXEMPLARY EMBODIMENTS

A technology below can be used in a variety of wireless communication systems, such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented using radio technology, such as universal terrestrial radio access (UTRA) or CDMA2000. TDMA can be implemented using radio technology, such as global system for mobile communications (GSM)/general packet radio service (GPRS)/enhanced data rates for GSM evolution (EDGE). OFDMA can be implemented using radio technology, such as IEEE 802.11(Wi-Fi), IEEE 802.16(WiMAX), IEEE 802-20, or Evolved UTRA (E-UTRA). IEEE 802.16m is the evolution of IEEE 802.16e, and it provides a backward compatibility with an IEEE 802.16e-based system. UTRA is part of a universal mobile telecommunications system (UMTS). 3rd generation partnership project (3GPP) long term evolution (LTE) is part of evolved UMTS (E-UMTS) using evolved-UMTS terrestrial radio access (E-UTRA), and it adopts OFDMA in downlink (DL) and SC-FDMA in uplink (UL). LTE-A (advanced) is the evolution of 3GPP LTE.

3GPP LTE(-A) and IEEE 802.11 are chiefly described as an example in order to clarify the description, but the technical spirit of the present invention is not limited to 3GPP LTE(-A) and IEEE 802.11.

Figure 1:
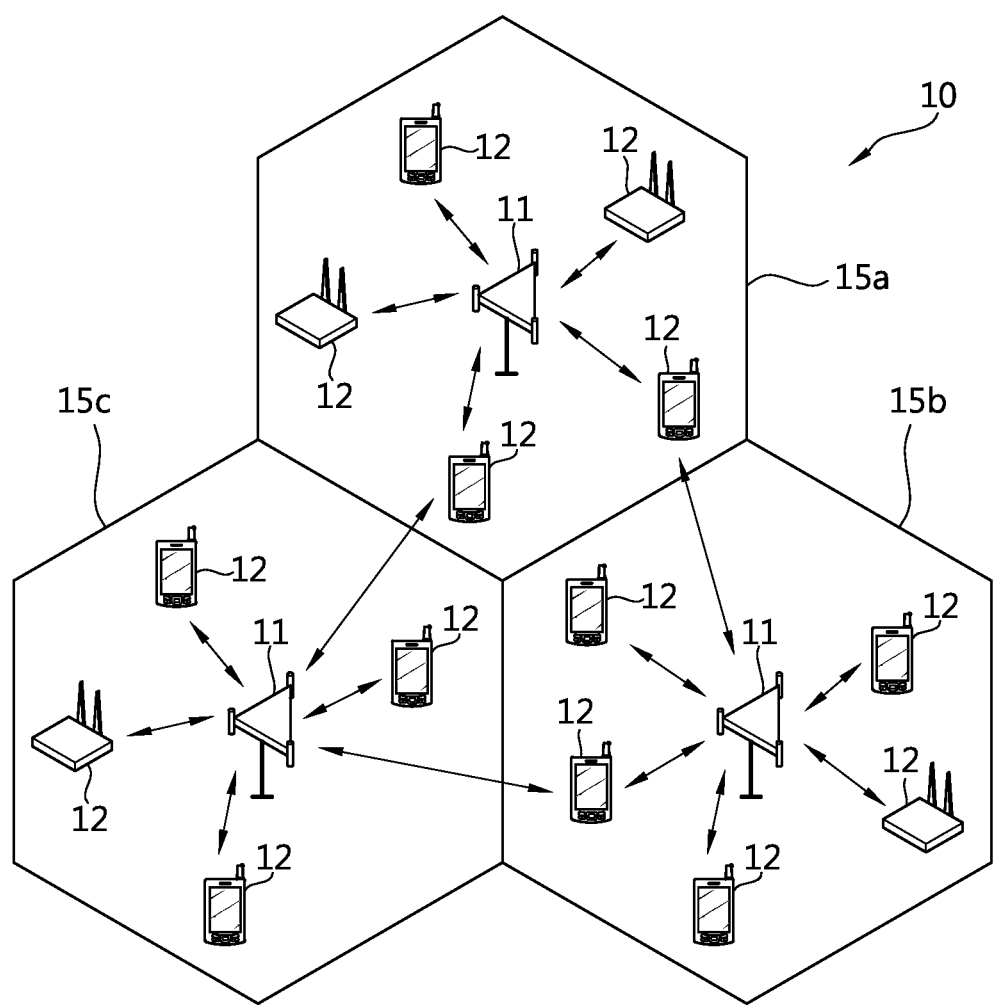
FIG. 1 shows a cellular system.

FIG. 1 shows a cellular system.

Referring to FIG. 1, the cellular system 10 includes one or more base stations (BSs) 11. The BSs 11 provide communication services to respective geographical areas (in general called 'cells') 15a, 15b, and 15c. Each of the cells can be divided into a number of areas (called 'sectors'). A user equipment (UE) 12 can be fixed or mobile and may be referred to as another terminology, such as a mobile station (MS), a mobile terminal (MT), a user terminal (UT), a subscriber station (SS), a wireless device, a personal digital assistant (PDA), a wireless modem, or a handheld device. In general, the BS 11 refers to a fixed station that communicates with the UEs 12, and it may be referred to as another terminology, such as an evolved-NodeB (eNB), a base transceiver system (BTS), or an access point.

The UE generally belongs to one cell. A cell to which a UE belongs is called a serving cell. A BS providing the serving cell with communication services is called a serving BS. A wireless communication system is a cellular system, and so it includes other cells neighboring a serving cell. Other cells neighboring the serving cell are called neighbor cells. A BS providing the neighbor cells with communication services is called as a neighbor BS. The serving cell and the neighbor cells are relatively determined on the basis of a UE.

This technology can be used in the downlink (DL) or the uplink (UL). In general, DL refers to communication from the BS 11 to the UE 12, and UL refers to communication from the UE 12 to the BS 11. In the DL, a transmitter may be part of the BS 11 and a receiver may be part of the UE 12. In the UL, a transmitter may be part of the UE 12 and a receiver may be part of the BS 11.

Figure 2:
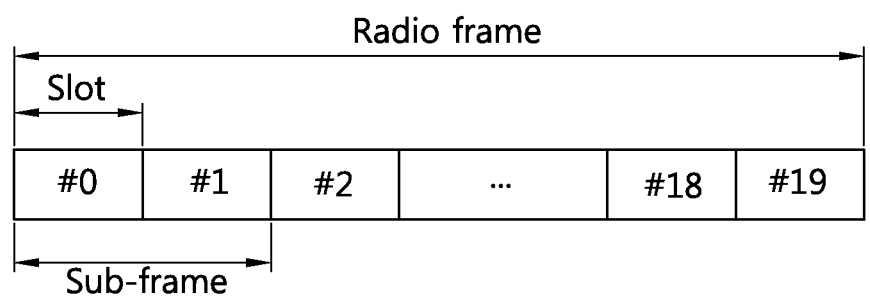
FIG. 2 shows an example of a radio frame structure of 3GPP LTE.

FIG. 2 shows an example of a radio frame structure of 3GPP LTE. It may be referred to Section 4 of 3GPP TS 36.211 V8.2.0 (2008-03).

Referring to FIG. 2, the radio frame includes 10 subframes, and one subframe includes two slots. The slots in the radio frame are numbered by #0 to #19. A transmission time interval (TTI) is a scheduling unit for a data transmission. In 3GPP LTE, one TTI may be identical with a time taken for transmitting one subframe. A radio frame may have a length of 10 ms, a subframe may have a length of 1 ms, and a slot may have a length of 0.5 ms.

One slot includes a plurality of orthogonal frequency division multiplexing (OFDM) symbols in a time domain and a plurality of subcarriers in a frequency domain. Since 3GPP LTE uses OFDMA in downlink, the OFDM symbols are used to express a symbol period. The OFDM symbols may be called by other names depending on a multiple-access scheme. For example, when a single carrier frequency division multiple access (SC-FDMA) is in use as an uplink multi-access scheme, the OFDM symbols may be called SC-FDMA symbols. A resource block (RB), a resource allocation unit, includes a plurality of continuous subcarriers in a slot. The structure of the radio frame is merely an example. Namely, the number of subframes included in a radio frame, the number of slots included in a subframe, or the number of OFDM symbols included in a slot may vary.

3GPP LTE defines that one slot includes seven OFDM symbols in a normal cyclic prefix (CP) and one slot includes six OFDM symbols in an extended CP.

Figure 3:
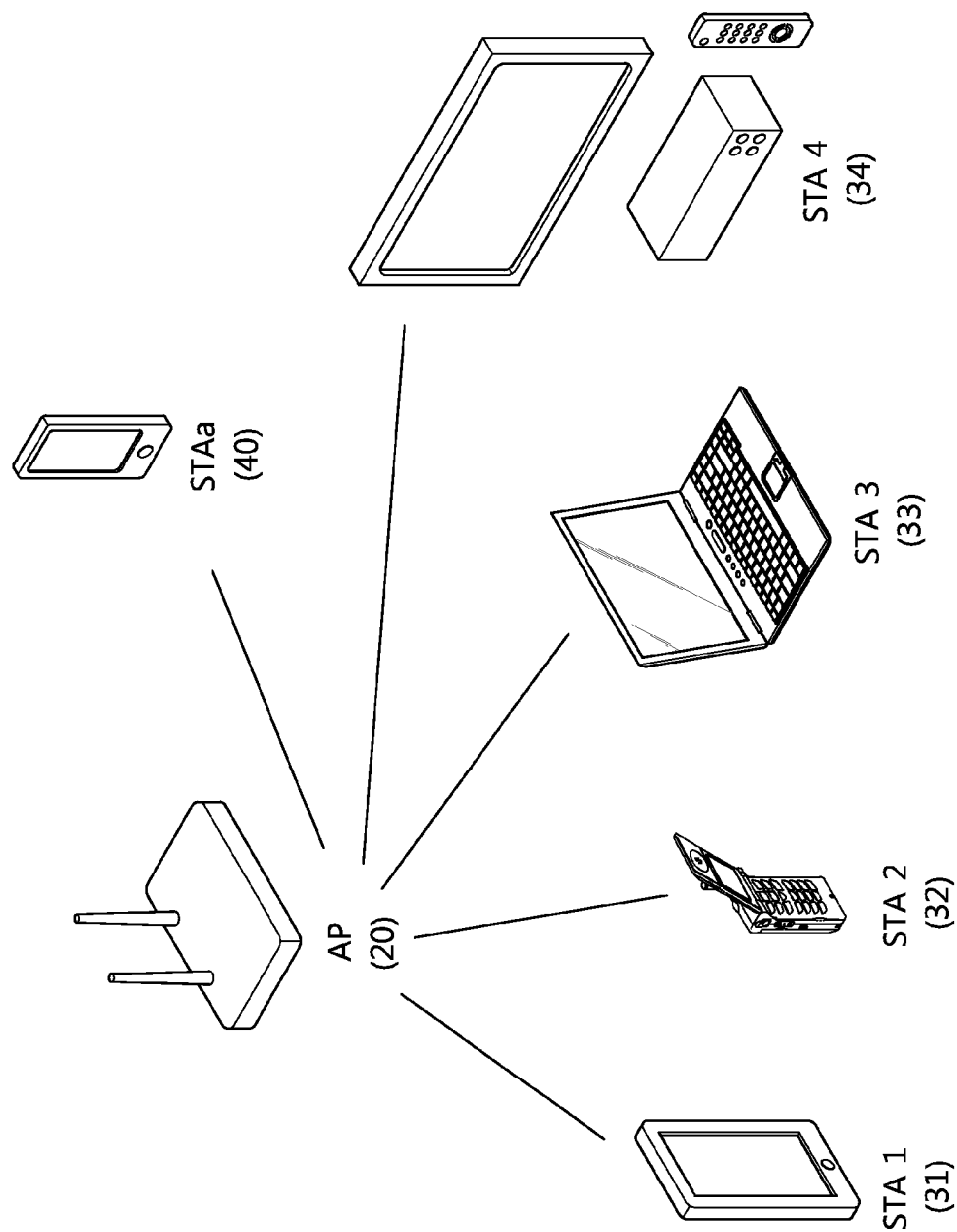
FIG. 3 shows a wireless local area network (WLAN) system.

FIG. 3 shows a wireless local area network (WLAN) system.

The WLAN system may also be referred to as a Wi-Fi system. Referring to FIG. 3, the WLAN system includes one access point (AP) 20 and a plurality of stations (STAs) 31, 32, 33, 34, and 4). The AP 20 may be linked to each STA 31, 32, 33, 34, and 40 and may communicate therewith. The WLAN system includes one or more basic service sets (BSSs). The BSS is a set of STAs that may be successfully synchronized with each other and may communicate with each other, and does not mean a specific region.

An infrastructure BSS includes one or more non-AP stations, APs that provide a distribution service (DS), and a DS that links a plurality of APs with each other. In the infrastructure BSS, an AP manages non-AP STAs of the BSS. Accordingly, the WLAN system shown in FIG. 3 may include an infrastructure BSS. In contrast, an independent BSS (IBSS) is a BSS that operates in ad-hoc mode. The IBSS does not include an AP and thus lacks a centralized management entity. That is, in the IBSS, the non-AP STAs are managed in a distributed manner. The IBSS may have all the STAs constituted of mobile STAs and is not allowed to access the distribution system, thus achieving a self-contained network.

The STA is random functional medium that includes a physical layer interface for a wireless medium and an media access control (MAC)) observing IEEE 802.11 standards, and in its broader concepts, it includes both the AP and non-AP station.

The non-AP STA is an STA, not an AP. The non-AP STA may also be referred to as a mobile terminal, a wireless device, a wireless transmit/receive unit (WTRU), a user equipment (UE), a mobile station (MS), a mobile subscriber unit or simply as a user. Hereinafter, for ease of description, the non-AP STA denotes an STA.

The AP is a functional entity that provides access to a distribution system via a wireless medium for an STA associated with the AP. In the infrastructure BSS including an AP, communication between STAs is basically done via an AP, but in case a direct link is established, direct communication may be achieved between STAs. The AP may also be referred to as a central controller, a base station (BS), a NodeB, a base transceiver system (BTS), or a site controller.

A plurality of infrastructure BSSs may be linked with each another through a distribution system. The plurality of BSSs linked with each another is referred to as an extended service set (ESS). The APs and/or STAs included in the ESS may communicate with each other, and in the same ESS, an STA may move from one BSS to another, while in seamless communication.

FIG. 4 shows an example of a frame structure of IEEE 802.11.

A frame of IEEE 802.11 includes a set of fields in a fixed order. Referring to FIG. 4, the frame of IEEE 802.11 includes a frame control field, a duration/ID field, an address 1 field, an address 2 field, an address 3 field, a sequence control field, an address 4 field, a quality of service (QoS) control field, an HT control field, a frame body field, and a frame check sequence (FCS) field. Among the fields listed above, the frame control field, the duration/ID field, the address 1 field, and the FCS field constitute a minimum IEEE 802.11 frame format, and may be included in all IEEE 802.11 frames. The address 2 field, the address 3 field, the sequence control field, the address 4 field, the QoS control field, the HT control field, and the frame body field may be included only in a specific frame type.

The frame control field may include various subfields. The duration/ID field may be 16 bits in length. The address field may include a basic service set identifier (BSSID), a source address (SA), a destination address (DA), a transmitting STA address (TA), and a receiving STA address (RA). In the address field, different fields may be used for other purposes according to a frame type. The sequence control field can be used when fragments are reassembled or when an overlapping frame is discarded. The sequence control field may be 16 bits, and may include two subfields indicating a sequence number and a fragment number. The FCS field can be used to check an error of a frame received by a station. The FCS field may be a 32-bit field including a 32-bit cyclic redundancy check (CRC). An FCS can be calculated across the frame body field and all fields of a media access control (MAC) header.

The frame body field may include information specified for an individual frame type and subtype. That is, the frame body field carries high-level data from one station to another station. The frame body field can also be called a data field. The frame body field can be variously changed in length. A minimum length of the frame body field may be zero octet. A maximum length of the frame body field may be determined by a total sum of a maximum length of a MAC service data unit (MSDU), a length of a mesh control field, and an overhead for encryption or a total sum of a maximum length of an aggregated MSDU (A-MSDU) and an overhead for encryption. The data frame includes high-level protocol data of the frame body field. The data frame may always include the frame control field, the duration/ID field, the address 1 field, the address 2 field, the address 3 field, the sequence control field, the frame body field, and the FCS field. A presence of an address 4 field may be determined by a configuration of a 'To DS' subfield and a 'From DS' subfield in the frame control field. Another data frame type can be categorized according to a function.

A management frame may always include the frame control field, the duration/ID field, the address 1 field, the address 2 field, the address 3 field, the sequence control field, the frame body field, and the FCS field. Data included in the frame body field generally uses a fixed-length field called a fixed field and a variable-length field called an information element. The information element is a variable-length data unit.

The management frame can be used for various purposes according to a subtype. That is, a frame body field of a different subtype includes different information. A beacon frame reports an existence of a network, and takes an important role of network maintenance. The beacon frame corresponds to a parameter which allows a mobile station to participate in the network. In addition, the beacon frame is periodically transmitted so that the mobile station can scan and recognize the network. A probe request frame is used to scan an IEEE 802.11 network in which the mobile station exists. A probe response frame is a response for the probe request frame. An authentication request is used so that the mobile station requests an access point to perform authentication. An authentication response frame is a response for the authentication request frame. A de-authentication frame is used to finish an authentication relation. An association request frame is transmitted so that the mobile station participates in the network when the mobile station recognizes the compatible network and is authenticated. An association response frame is a response for the association request frame. A de-association frame is used to finish an association relation.

Three states may exist according to an authentication and association procedure in IEEE 802.11. Table 1 below shows the three states of IEEE 802.11.

TABLE 1

|  | Authentication | Association |
|---|---|---|
| State 1 | X | X |
| State 2 | ○ | X |
| State 3 | ○ | ○ |

To transmit a data frame, a device must perform the authentication and association procedure with respect to a network. In Table 1, a procedure of transitioning from the state 1 to the state 2 can be called the authentication procedure. The authentication procedure can be performed in such a manner that one device acquires information on a different device and authenticates the different device. The information on the different device can be acquired by using two methods, i.e., a passive scanning method for acquiring information on a different node by receiving a beacon frame and an active scanning method for acquiring the information on the different device by transmitting a probe request message and receiving a probe response message received in response thereto. The authentication procedure can be complete by exchanging an authentication request frame and an authentication response frame.

In Table 1, a procedure of transitioning from the state 2 to the state 3 can be called the association procedure. The association procedure can be complete when two devices exchange the association request frame and the association response frame upon completion of the authentication procedure. An association ID can be allocated by the association procedure.

Figure 5:
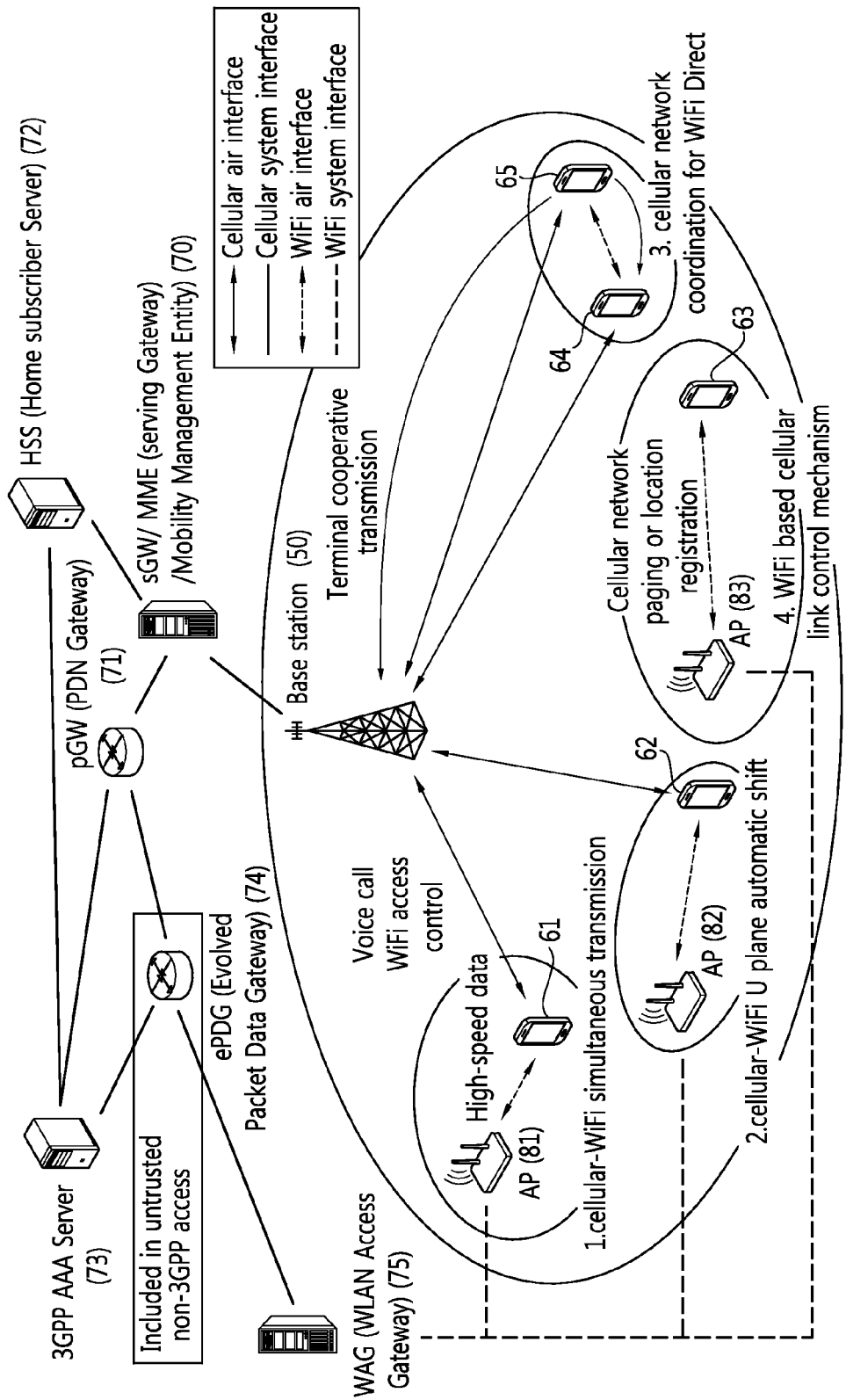
FIG. 5 shows an example of a scenario of a converged communication system of a cellular system and a Wi-Fi system.

FIG. 5 shows an example of a scenario of a converged communication system of a cellular system and a Wi-Fi system.

It is assumed in FIG. 5 that the cellular system operates as a primary RAT system of the converged communication system, and the Wi-Fi system operates as a secondary RAT system of the converged communication system. Further, the cellular system may be a 3GPP LTE(-A) system. Hereinafter, for ease of description, it is assumed that the primary RAT system of the converged communication system is a 3GPP LTE(-A) system, and the secondary RAT system of the communication system is an IEEE 802.11 system, i.e., a Wi-Fi system. However, embodiments of the present invention are not limited thereto.

Referring to FIG. 5, there are a plurality of general devices 61, 62, 63, 64, and 65 in the coverage of the cellular base station 50. Each of the general devices 61, 62, 63, 64, and 65 may be a user equipment in a cellular system. The cellular base station 50 may communicate with each of the general devices 61, 62, 63, 64, and 65 via a cellular radio interface. For example, the cellular base station 50 may perform voice call communication with each of the general devices 61, 62, 63, 64, and 65 or may control access of each general device 61, 62, 63, 64, and 65 to a Wi-Fi system.

The cellular base station 50 is connected to a serving gateway (S-GW)/mobility management entity (MME) 70 through a cellular system interface. The MME contains a user equipment's access information or information on a user equipment's capability, and such information may be mainly used for mobility management. The MME is in charge of a control plane. The S-GW is a gateway having an E-UTRAN as an end point. The S-GW is in charge of a user plane. The S-GW/MME 70 is connected to a packet data network (PDN) gateway (P-GW) 71 and a home subscriber server (HSS) 72 through the cellular system interface. The PDN-GW is a gateway having a PDN as an end point.

The P-GW 71 and the HSS 72 are connected to a 3GPP access authentication authorization (AAA) server 73 through the cellular system interface. The P-GW 71 and the 3GPP AAA server 73 may be connected to an evolved packet data gateway (ePDG) 74 through the cellular system interface. The ePDG 74 may be included only in un-trusted non-3GPP access. The ePDG 74 may be connected to a WLAN access gateway (WAG) 75. The WAG 75 may be in charge of a P-GW in a Wi-Fi system.

Meanwhile, a plurality of APs 81, 82, and 83 may be present in the coverage of the cellular base station 50. Each of the APs 81, 82, and 83 may have coverage which is shorter than that of the cellular base station 50. Each of the APs 81, 82, and 83 may communicate with general devices 61, 62, and 63 that are present in its coverage through a Wi-Fi radio interface. In other words, the general devices 61, 62, and 63 may communicate with the cellular base station 50 and/or APs 81, 82, and 83. Communication methods of the general devices 61, 62, and 63 are as follows:

1) Cellular/Wi-Fi simultaneous radio transmission: the general device 61 may perform high-speed data communication with the AP 81 through a Wi-Fi radio interface while communicating with the cellular base station 50 through a cellular radio interface.

2) Cellular/Wi-Fi user plane automatic shift: the general device 62 may communicate with one of the cellular base station 50 and the AP 82 by user plane automatic shift. At this time, the control plane may be present in both the cellular system and the Wi-Fi system or only in the cellular system.

3) Terminal cooperative transmission: the general device 64 operating as a source device may directly communicate with the cellular base station 50 through a cellular radio interface or may indirectly communicate with the cellular base station 50 through a general device 65 operating as a cooperative device. That is, the cooperative device 65 may assist the source device 64 so that the source device 64 may indirectly communicate with the cellular base station 50 through itself. The source device 64 and the cooperative device 65 communicate with each other through a Wi-Fi radio interface.

4) Wi-Fi-based cellular link control mechanism: the AP 83 may perform a cellular link control mechanism such as paging or location registration of a network for the cellular general device 63. The general device 63 is not directly connected to the cellular base station 50 and may directly communicate with the cellular base station 50 thorough the AP 83.

Each of the APs 81, 82, and 83 is connected to the WAG 75 through a Wi-Fi system interface.

In general, when interworking is performed between the cellular system and the Wi-Fi system, all data flows transmitted/received through a secondary RAT system (e.g., Wi-Fi system) as well as a primary RAT system (e.g., cellular system) always go through a device operating as a local mobility anchor (LMA). For example, referring to FIG. 5, data to be transmitted through a cellular system and data to be transmitted through a Wi-Fi system always go through the P-GW. That is, In FIG. 5, a device serving as an LMA may be the P-GW. In this regard, a term "LMA" used in a proxy mobile Internet protocol (PMIP) protocol may be called a different term in another protocol.

Figure 6:
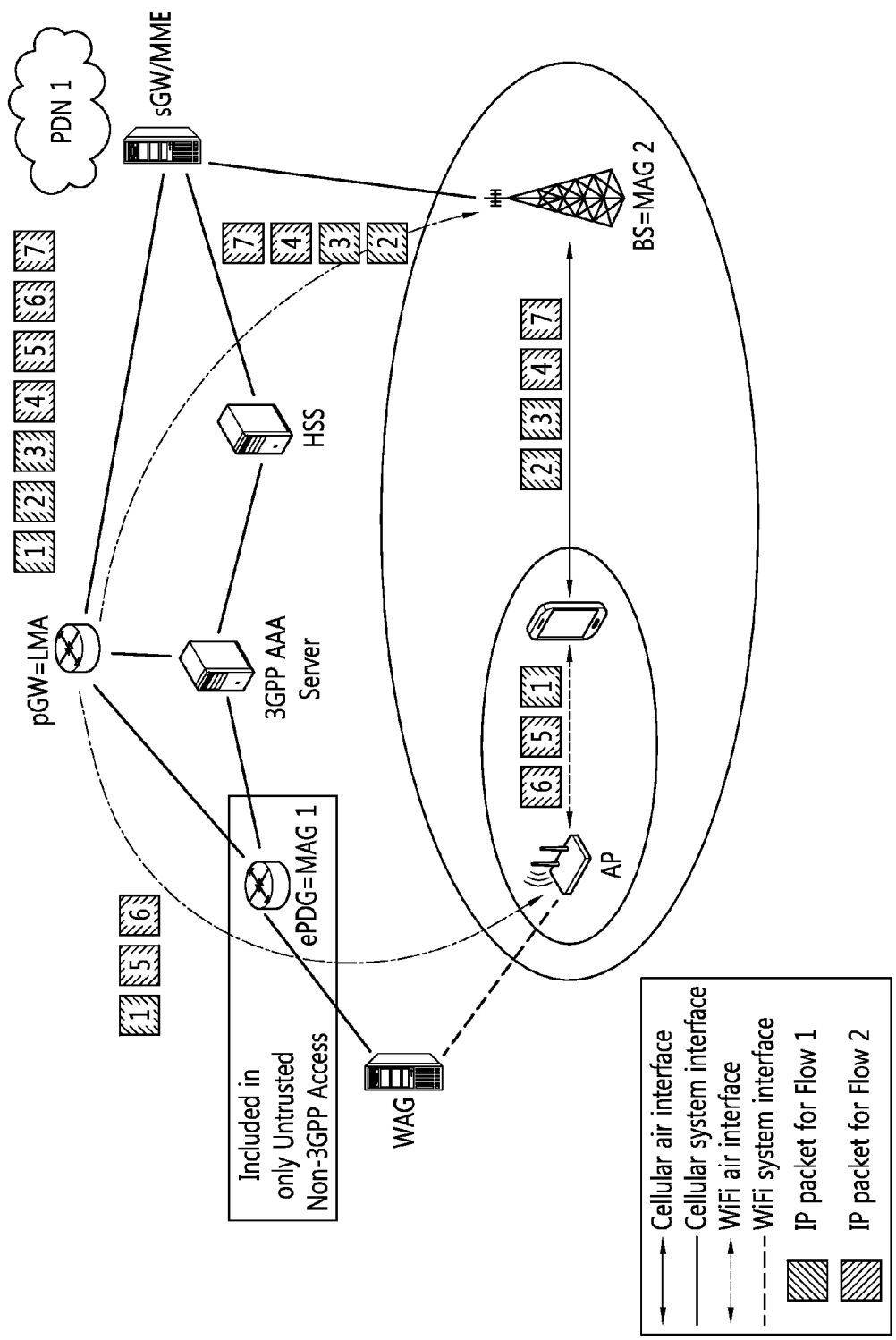
FIG. 6 shows an example of IP flow mobility in a converged communication system of a cellular system and a Wi-Fi system.

FIG. 6 shows an example of IP flow mobility in a converged communication system of a cellular system and a Wi-Fi system. FIG. 6 shows the IP flow mobility of downlink data.

Referring to FIG. 6, IP packets for flow 1 include IP packets 1, 2, and 3, and IP packets for flow 2 include IP packets 4, 5, 6, and 7. The P-GW is connected to a PDN 1, and operates as an LMA. That is, all IP packets are transmitted to a UE through the P-GW. The IP packet 1 in the IP packet for flow 1 is transmitted to the UE through the Wi-Fi system by going through an ePDG and/or a WAG, and IP packets 2 and 3 are transmitted to the UE through the cellular system by going through a BS. In this case, the ePDG or the WAG may be a mobile access gateway (MAG)

in the Wi-Fi system, and the BS may be a MAG in the cellular system. In the IP packet for flow 2, the IP packets 5 and 6 are transmitted to the UE through the Wi-Fi system by going through the PDG and/or the WAG, and IP packets 4 and 7 are transmitted to the UE through the cellular system by going through the BS.

As shown in FIG. 6, since all data always go through the P-GW, an overload may be applied to the P-GW, and transmission/reception of traffic in the secondary RAT system may be delayed. Accordingly, a data routing method to solve the above problems may be required. Hereinafter, a method of selectively routing an uplink data flow according to a load of a core network (CN) of a primary RAT system using an entity of a secondary RAT system, operating as an MAG, according to the embodiment of the present invention is described. In a following description, it is assumed that the primary RAT system is a 3GPP LTE system and the secondary RAT system is a Wi-Fi system, but the present invention is not limited thereto. An entity of the secondary RAT system may be an ePDG in un-trusted non-3GPP access, and may be a WAG in trusted non-3GPP access. A term "MAG" used in a PMIP protocol may be called a different term in another protocol.

Figure 7:
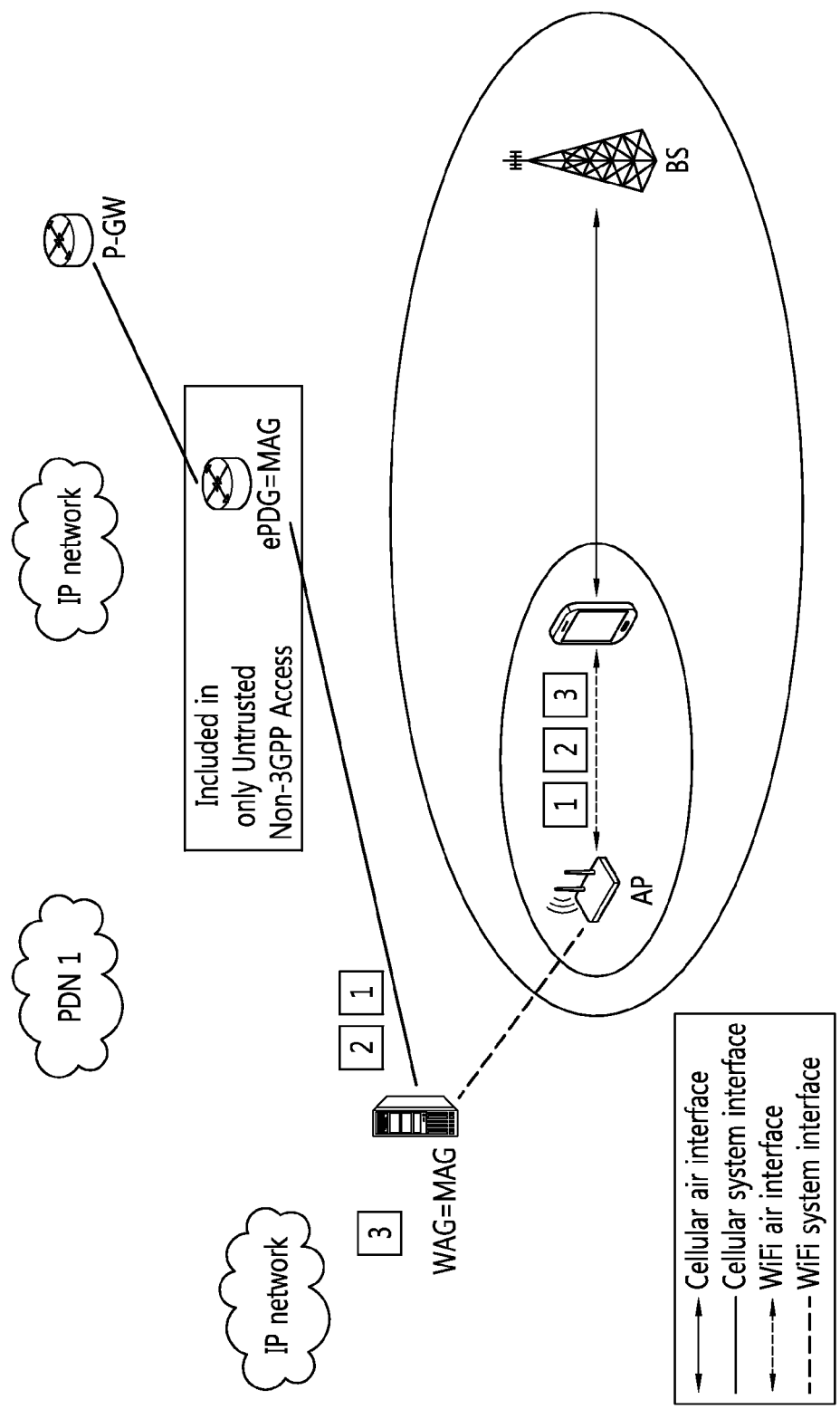
FIG. 7 shows an example of a method of routing data according to an embodiment of the present invention.

FIG. 7 shows an example of a method of routing data according to an embodiment of the present invention. If the UE transmits uplink data through an AP, the WAG or the ePDG routes the uplink data to be selectively transmitted through the 3GPP LTE system or the Wi-Fi system. Referring to FIG. 7, IP packets 1 and 2 are transmitted to a PDN 1 through a 3GPP LTE system by going through the P-GW. The IP packet 3 is transmitted to the PDN 1 through the Wi-Fi system without going through the P-GW. Accordingly, this may prevent an overload from being applied to the P-GW.

A data routing enhancement method in trusted non-3GPP access according to an embodiment of the present invention is described.

Figure 8:
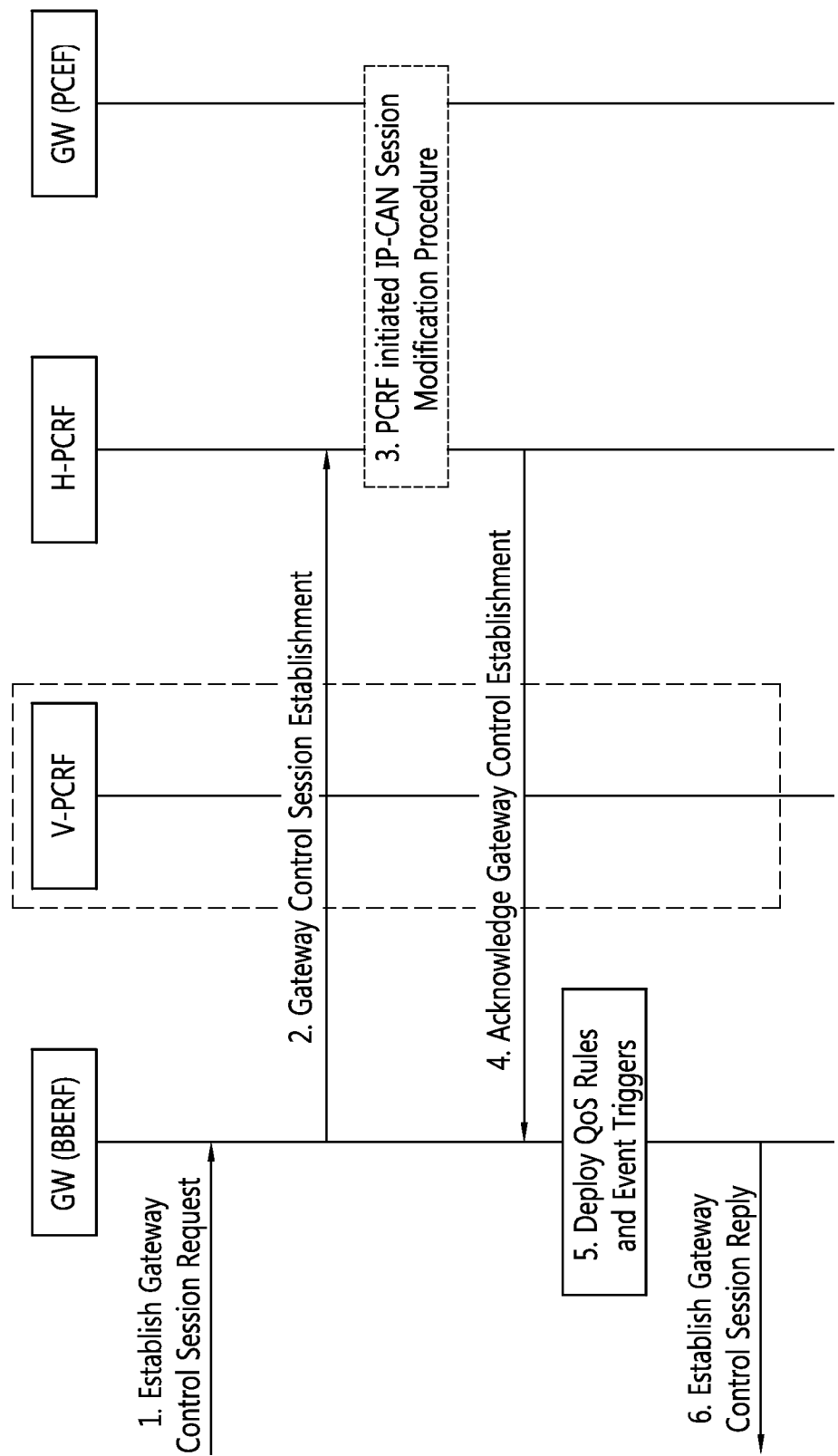
FIG. 8 shows a gateway control session establishment procedure.

FIG. 8 shows a gateway control session establishment procedure. It may be referred to Section 7.7.1.1 of 3GPP TS 23.203 V11.8.0 (2012-12). This procedure is used to establish sessions for gateway control between an entity of trusted non-access 3GPP access (e.g., WAG) and an entity of a 3GPP access (e.g., P-GW, bearer binding and event reporting function (BBREF), policy control and charging rules function (PCRF)). The policy control and charging enforcement function (PCEF) establishes the IP connectivity access network (IP-CAN) session during the gateway control session establishment procedure. This happens when the UE attaches to the evolved packet core (EPC) for the first time and when the UE establishes a new PDN connection.

This procedure concerns both roaming and non-roaming scenarios. In the roaming case when a gateway control session is used, the visited PCRF (V-PCRF) should proxy the gateway control session establishment procedure between the BBERF in the visited public land mobile network (VPLMN) and the home PCRF (H-PCRF) over S9 based on PDN-Id and roaming agreements. In the non-roaming case, the V-PCRF is not involved.

1. The GW (BBERF) receives an establish gateway control session request indicating that it must establish a gateway control session. The establish gateway control session request may be received from the WAG.

2. The GW (BBERF) sends the PCRF a gateway control session establishment. The BBERF includes the following information: IP-CAN type, UE identity, PDN identifier (if known), IP address(es) (if known), an indication that leg linking shall be deferred, if available, the PDN connection identifier and if available, the IP-CAN bearer establishment modes supported and the indication of BBERF support for the extended Traffic Flow Template TFT) filter format. The IP-CAN type identifies the type of access used by the UE. The UE's identity and PDN identifier requested are used to identify the subscriber and in PCRF selection to locate the PCRF function with the corresponding IP-CAN session established by the P-GW. The BBERF may also include the default bearer QoS and APN aggregate maximum bit rate (APN-AMBR). An indication that leg linking shall be deferred is included to inform the PCRF that linking the gateway control session to a Gx session shall occur when a matching Gx message is received. Further information is supplied on an access specific basis.

3. For GSM/EDGE radio access network (GERAN)/UTRAN accesses, if the PCRF is required to interact with the GW (PCEF), the PCRF waits until it gets informed about the establishment of the corresponding IP-CAN session and performs a PCRF initiated IP-CAN session modification procedure with the GW (PCEF).

4. The PCRF sends an acknowledge gateway control session establishment to the GW (BBERF). The PCRF may include the following information: the chosen IP-CAN bearer establishment mode, QoS rules and event triggers. A charging ID may be provided together with QoS rules. The QoS policy rules are employed by the GW (BBERF) to perform bearer binding. The event triggers indicate events that require the GW (BBERF) to report to the PCRF.

5. The QoS rules and event triggers received by the GW (BBERF) are deployed. This will result in bearer binding being performed, according to the rules. This step may trigger IP-CAN bearer establishment procedures. The details of bearer establishment are IP-CAN specific.

6. The GW (BBERF) transmits an establish gateway control session reply to the WAG. The establish gateway control session reply may include the chosen IP-CAN bearer establishment mode, QoS rules and event triggers. IP flow mobility routing rule is described. It may be referred to Section 6.7 of 3GPP TS 23.203 V11.8.0 (2012-12).

The routing rule comprises the information that is required for the PCRF to install the QoS rules for a service data flow at the right BBERF in flow mobility scenarios. The PCRF relies on the IP flow mobility routing information contained in the IP flow mobility routing rule to the applicable BBERF for each PCC/QoS rule. The IP flow mobility routing rules are provided by the PCEF to the PCRF during IP-CAN session establishment or modification.

The PCEF derives IP flow mobility routing rules based on flow binding information received from the UE.

Table 2 lists the information contained in a routing rule, including the information name, the description and whether the PCEF may modify this information in an updated version of the rule. The Category field indicates if a certain piece of information is mandatory or not.

TABLE 2

| Information name | Description | Category | PCEF permitted to modify in an update |
|---|---|---|---|
| Rule identifier | Uniquely identifies the routing rule within an IP-CAN session. It is assigned by the PCEF. | Mandatory | No |
| Routing information | This clause defines the method for detecting packets belonging to a flow and the route for the flow. | | |

TABLE 2-continued

| Information name | Description | Category | PCEF permitted to modify in an update |
|---|---|---|---|
| Precedence | Determines the order, in which the routing filters are applied. | Mandatory | Yes |
| Packet filter | A list of packet filters for the detection of IP flows. | Mandatory | Yes |
| IP flow mobility Routing Address | The IP flow mobility Routing Address that the matching IP flows use. | Mandatory | Yes |

The Rule identifier shall be unique for a routing rule within an IP-CAN session. It is assigned by the PCEF. The Precedence defines in what order the routing rules is used by the PCRF to determine where to route a service data flow. The Precedence is derived from the priority included in the binding update. The Packet filter may comprise any number of packet filters, containing information for matching service data flows. The format of the packet filter is the same as the service data flow filter. A default packet filter can be specified by using wild card filter. The IP flow mobility Routing Address identifies the IP address to be used for all service data flows matching the packet filters specified for this routing rule. The IP flow mobility Routing Address can be equal to the care-of address, or to the UE IP address (home address) in case of home link operations.

IP flow mobility routing rule operations consist of installation, modification and removal of routing rules.

During installation of a routing rule, the PCEF provides the routing rule information to the PCRF via the Gx reference point. The PCRF uses all the installed routing rules related to an IP-CAN session to select BBERF for any service data flow related for that IP-CAN session.

The PCEF may, at any time, modify or remove an installed routing rule based on updated flow binding information received from the UE.

For a data routing enhancement in trusted non-3GPP access, a WAG and an entity of the 3GPP system may determine rules to determine a path of a core network in which uplink data is routed. That is, in order to adjust a load of the core network in the 3GPP system, the entity of the 3GPP system may additionally transmit following parameters to the WAG in the gateway control session establishment procedure described above.

3GPP core network load information: This parameter may be included in QoS rules in the gateway control session establishment procedure transmitted from the entity of the 3GPP system.

Core network routing rule: This parameter may include a 1-bit indicator indicating whether to transmit uplink data through a core network of the 3GPP system or a core network of a non-3GPP system and a transmission ratio indicating a ratio of traffic transmitted through the core network of the 3GPP system to traffic transmitted through the core network of the non-3GPP system. The core network routing rule may be transmitted by being included in routing rules listed in Table 2, and may be mapped together with a rule identifier.

That is, the entity of the 3GPP system may determine uplink data through which core network of a system in any transmission rate by taking into consideration a state of the core network of the 3GPP system and a service characteristic of traffic to be transmitted. Parameters such as the 3GPP core network load information and/or the core network routing rule may be set in the IP-CAN session establishment/modification procedure.

Figure 9:
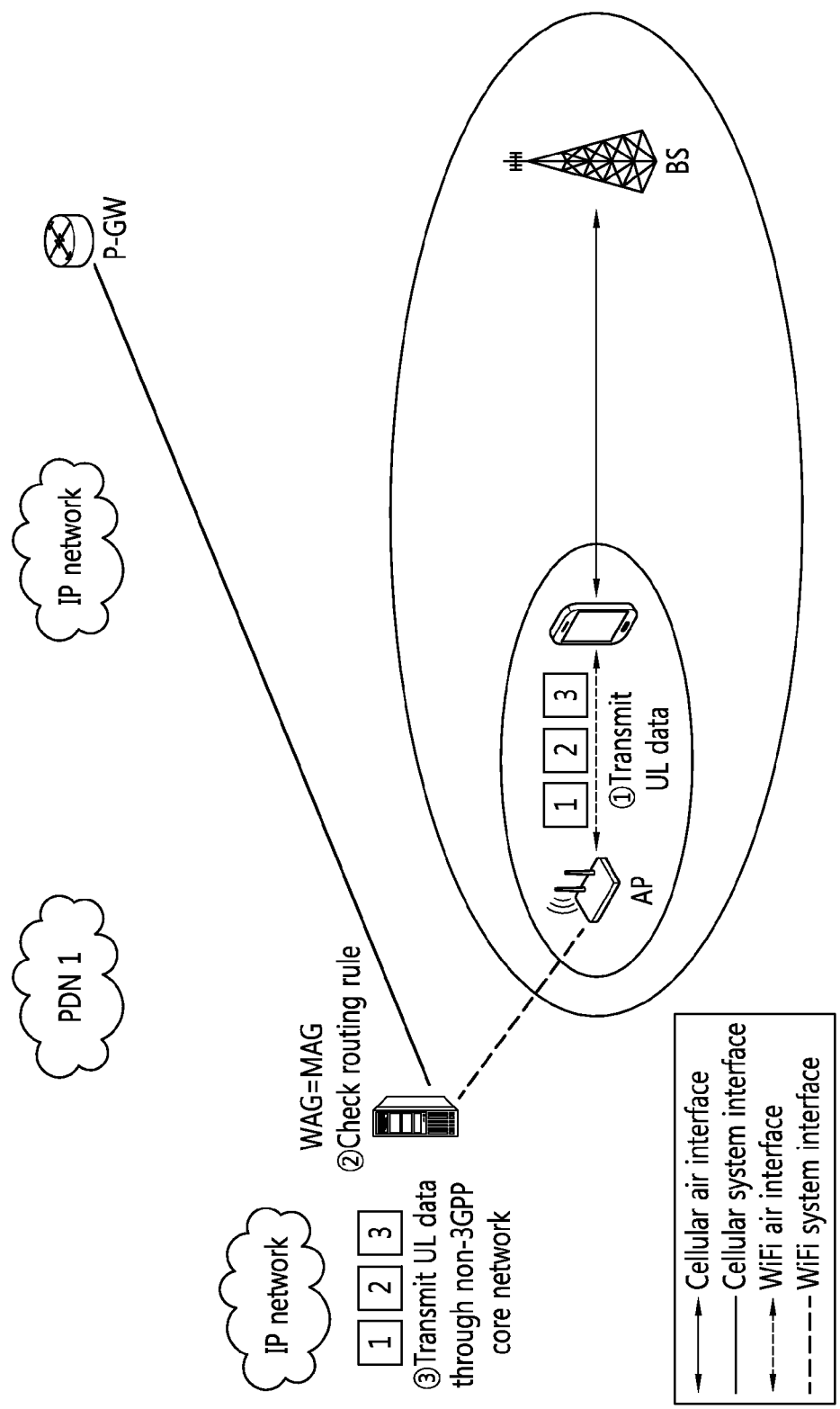
FIG. 9 shows an example of a method for routing data in trusted non-3GPP access according to an embodiment of the present invention.

FIG. 9 shows an example of a method for routing data in trusted non-3GPP access according to an embodiment of the present invention. Referring to FIG. 9, a UE firstly transmits UL data to a WAG through an AP. The WAG operating as an MAG checks a routing rule based on parameters such as 3GPP core network load information and the core network routing rule received from the entity of the 3GPP system. The WAG may route the UL data received based the checked routing rule. FIG. 9 shows a case where the WAG checking the routing rule routes UL data to the core network of the non-3GPP system. In this case, the 1-bit indicator included in the core network routing rule parameter may indicate that the UL data are transmitted through the core network of the non-3GPP system. Meanwhile, the WAG may transmit information on charging to the entity of the 3GPP system.

A data routing enhancement method in un-trusted non-3GPP access according to an embodiment of the present invention is described.

Figure 10:
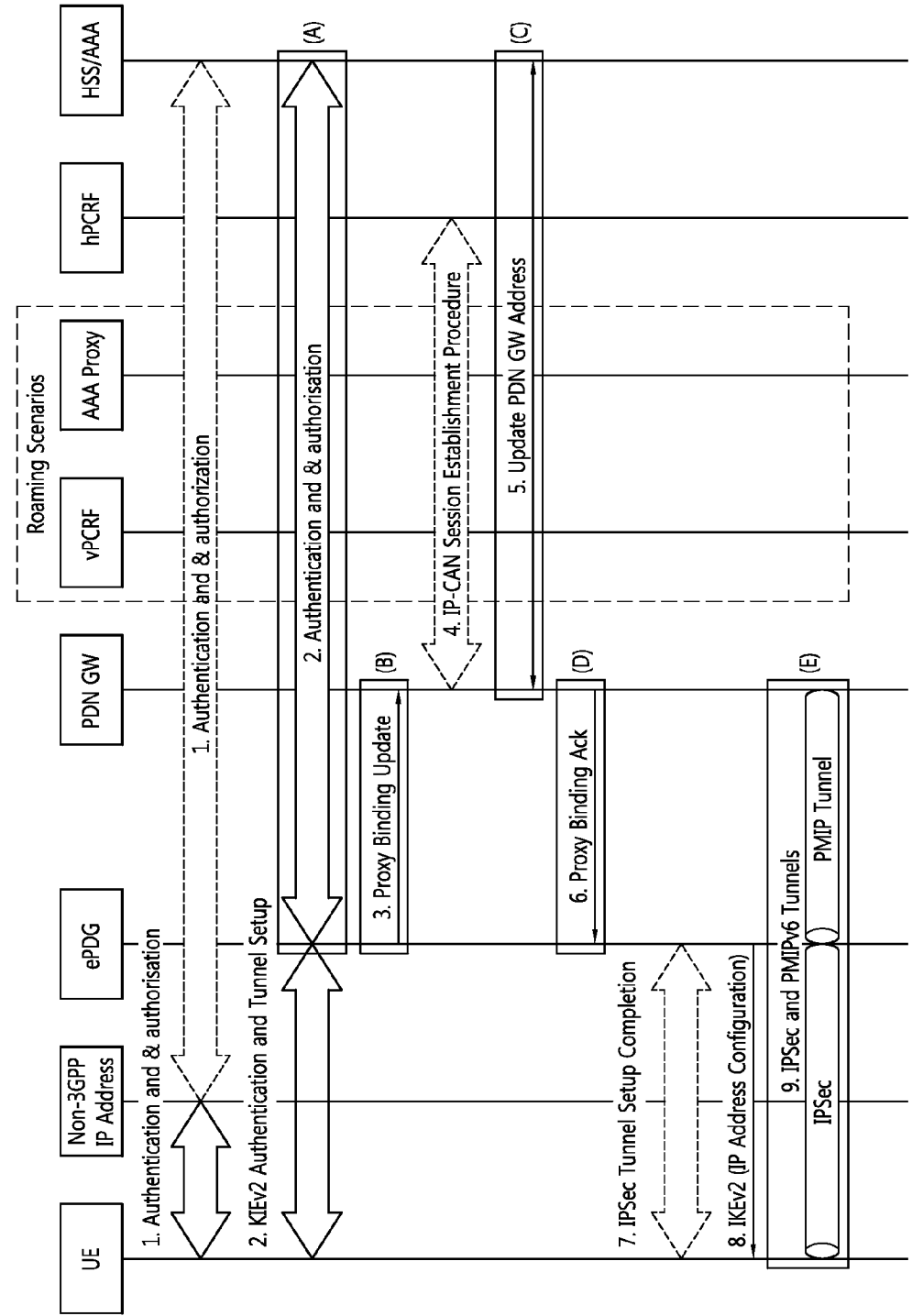
FIG. 10 shows an initial attachment procedure over PMIP based S2b for roaming, non-roaming and LBO.

FIG. 10 shows an initial attachment procedure over PMIP based S2b for roaming, non-roaming and LBO. It may be referred to Section 7.2.1 of 3GPP TS 23.402 V11.5.0 (2012-12).

This clause is related to the case when the UE powers-on in an un-trusted non-3GPP IP access network via the PMIP based S2b interface.

PMIPv6 specification is used to setup a PMIPv6 tunnel between the ePDG and the P-GW. It is assumed that MAG is collocated with ePDG. The IPsec tunnel between the UE and the ePDG provides a virtual point-to-point link between the UE and the MAG functionality on the ePDG.

This procedure is also used to establish the first PDN connection over an un-trusted non-3GPP access with PMIPv6 on S2b when the UE already has active PDN connections only over a 3GPP access and wishes to establish simultaneous PDN connections to different APNs over multiple accesses.

The UE may be authenticated and authorized to access the un-trusted non-3GPP access network with an access network specific procedure.

1) The access authentication procedure between UE and the 3GPP EPC may be performed. In the roaming case signalling may be routed via a 3GPP AAA proxy in the VPLMN. As part of the AAA exchange for network access authentication, the AAA/HSS and/or the 3GPP AAA proxy may return to the non-3GPP IP access a set of home/visited operator's policies to be enforced on the usage of local IP address, or IPv6 prefix, allocated by the access system upon successful authentication. Subscription data is provided to the non-3GPP IP access by the HSS/AAA in this step.

2) The IKEv2 tunnel establishment procedure is started by the UE. The UE may indicate in a notification part of the IKEv2 authentication request that it supports MOBIKE. The ePDG IP address to which the UE needs to form IPsec tunnel is discovered via DNS query. The UE may request connectivity to a specific PDN providing an APN that is conveyed with IKEv2. For networks supporting multiple mobility protocols, if there was any dynamic IPMS decision involved in this step, the decision is stored in the 3GPP AAA server. The P-GW information is returned as part of the reply from the 3GPP AAA server to the ePDG. If the UE has provided an APN the ePDG verifies that it is allowed by subscription. If the UE has not provided an APN the ePDG uses the default APN. The P-GW selection takes place at this point. This may entail an additional name resolution step, issuing a request to a DNS server. If there is no requested IP address in the CFG_Request from the UE to the ePDG which indicates the attach is an initial attach, the ePDG may perform a new P-GW selection procedure, e.g., to allocate a P-GW that allows for more efficient routeing. The UE shall indicate the type of address(es) (IPv4 address or IPv6 prefix/address or both) in the CFG_Request sent to the ePDG during IKEv2 message exchange. If the PDN requires an additional authentication and authorisation with an external AAA server, the UE includes the authentication credentials in this step.

3) The ePDG sends the proxy binding update (MN-NAI, Lifetime, APN, Access Technology Type, Handover Indicator, GRE key for downlink traffic, UE Address Info, Charging Characteristics, Additional Parameters) message to the P-GW. Access Technology Type option is set to a value matching the characteristics of the non-3GPP IP access. Handover Indicator is set to indicate attachment over a new interface. The proxy binding update message shall be secured. The MN NAI identifies the UE. The Lifetime field must be set to a nonzero value in the case of a registration and a zero value in the case of deregistration. The APN is used by the P-GW to determine which PDN to establish connectivity for, in the case that the P-GW supports multiple PDN connectivity. The ePDG creates and includes a PDN connection identity if the ePDG supports multiple PDN connections to a single APN. The UE Address Info shall be set based on the CFG_Request in step 1 and subscription profile in the same way as the PDN type is selected during the E-UTRAN initial attach. The Additional Parameters include the authentication credentials for an additional authentication and authorization with an external AAA server if it was provided by the UE in step 2. The P-GW performs the authentication and authorization with the external AAA server if it is required to get access for the given APN.

4) The P-GW initiates the IP CAN session establishment procedure with the PCRF.

5) The selected P-GW informs the 3GPP AAA server of the P-GW identity. The 3GPP AAA Server then informs the HSS of the P-GW identity and APN associated with the UE's PDN connection. The message includes information that identifies the PLMN in which the P-GW is located. This information is registered in the HSS.

6) The P-GW processes the proxy binding update and creates a binding cache entry for the UE. The P-GW allocates an IP address for the UE. The P-GW then sends a proxy binding ack (MN NAI, UE Address Info, GRE Key for uplink traffic, Charging ID) message to the ePDG, including the IP address(es) allocated for the UE (identified by the MN NAI). If the corresponding proxy binding update contains the PDN connection identity, the P-GW shall acknowledge if multiple PDN connections to the given APN are supported. The Charging ID is assigned for the PDN connection for charging correlation purposes.

7) After the proxy binding update is successful, the ePDG is authenticated by the UE and indicates to the UE that the authentication and authorization with the external AAA server is successful.

8) The ePDG sends the final IKEv2 message with the IP address in IKEv2 configuration payloads. The ePDG also includes the identity of the associated PDN (APN) in the IDr payload of IKEv2. In case the UE provided APN to the ePDG in the earlier steps, the ePDG shall not change the provided APN.

9) IP connectivity from the UE to the P-GW is now setup. Any packet in the uplink direction is tunnelled to the ePDG by the UE using the IPSec tunnel. The ePDG then tunnels the packet to the P-GW. From the P-GW normal IP-based routing takes place. In the downlink direction, the packet for UE (HoA) arrives at the P-GW. The P-GW tunnels the packet based on the binding cache entry to the ePDG. The ePDG then tunnels the packet to the UE via proper IPsec tunnel.

Figure 11:
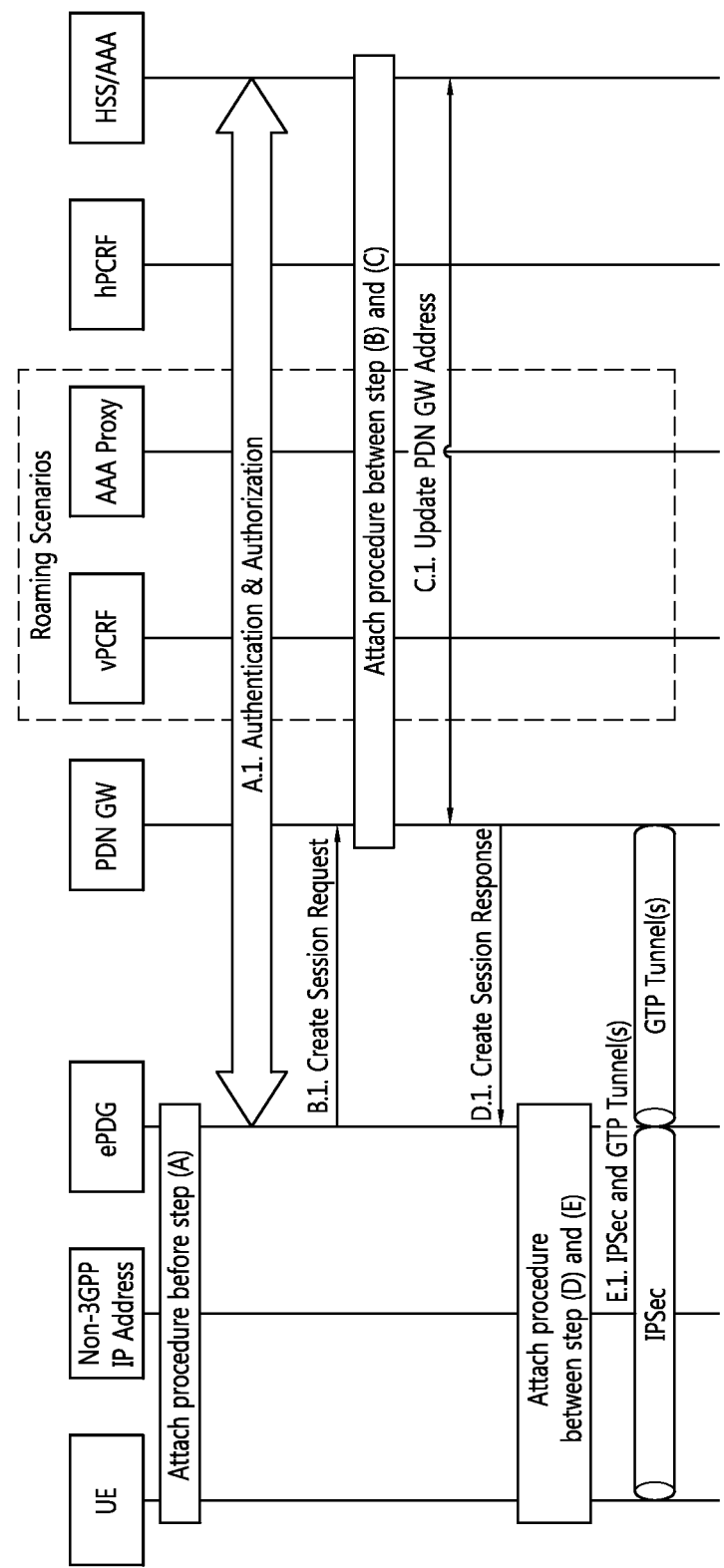
FIG. 11 shows an initial attachment procedure over GPRS tunneling protocol (GTP) based S2b for roaming, non-roaming and LBO.

FIG. 11 shows an initial attachment procedure over GPRS tunneling protocol (GTP) based S2b for roaming, non-roaming and LBO. It may be referred to Section 7.2.4 of 3GPP TS 23.402 V11.5.0 (2012-12).

This clause is related to the case when the UE powers-on in an un-trusted non-3GPP IP access network via the GTP based S2b interface.

GTPv2 is used to setup GTP tunnel(s) between the ePDG and the P-GW. The IPsec tunnel between the UE and the ePDG provides a virtual point-to-point link between the UE and the ePDG.

This procedure is also used to establish the first PDN connection over an un-trusted non-3GPP access with GTP on S2b when the UE already has active PDN connections only over a 3GPP access and wishes to establish simultaneous PDN connections to different APNs over multiple accesses.

The UE may be authenticated and authorized to access the un-trusted non-3GPP access network with an access network specific procedure.

A.1) Step A.1 is the same as Step A of FIG. 10, with the following addition:
    upon a successful authorization, the 3GPP AAA server returns the following additional information, regardless of which protocol variant the ePDG will select on S2b: APN-AMBR, static QoS Profile and Trace Information (Trace Reference, Trace Type, Trigger Id, OMC Identity) if applicable.

B.1) The ePDG sends a create session request (IMSI, APN, RAT type, ePDG TEID for control plane, PDN Type, PDN Address, EPS Bearer Identity, Default EPS Bearer QoS, ePDG Address for the user plane, ePDG TEID of the user plane, APN-AMBR, Selection Mode, Dual Address Bearer Flag, Trace Information, Charging Characteristics, Additional Parameters) message to the P-GW. The RAT type indicates the non-3GPP IP access technology type. The PDN Type shall be set based on the CFG_Request in step 1 and subscription profile in the same way as the PDN type is selected during the E-UTRAN initial attach. The ePDG shall set the Dual Address Bearer Flag when the PDN type is set to IPv4v6 and all SGSNs which the UE may be handed over to are Release 8 or above supporting dual addressing, which is determined based on node pre-configuration by the operator. The ePDG shall include Trace Information if P-GW trace is activated. The Additional Parameters include the authentication credentials for an additional authentication and authorization with an external AAA server if it was provided by the UE before this step. The P-GW performs the authentication and authorization with the external AAA server if it is required to get access for the given APN.

The P GW creates a new entry in its bearer context table and generates a Charging Id. The new entry allows the P-GW to route user plane PDUs between the ePDG and the packet data network and to start charging.

C.1) Step C.1 is the same as Step C of FIG. 10, with the following addition:
    when informing the 3GPP AAA Server of the P-GW identity, the selected P-GW also indicates the selected S2b protocol variant (here GTP); this allows the option for the 3GPP AAA Server or 3GPP AAA Proxy not to return to the P-GW PMIP specific parameters (e.g., static QoS Profile, Trace Information, APN-AMBR) if GTP is used over S2b; the P-GW shall ignore those parameters if received from the 3GPP AAA Server or 3GPP AAA Proxy.

D.1) The P-GW returns a create session response (P-GW Address for the user plane, P-GW TEID of the user plane, P-GW TEID of the control plane, PDN Type, PDN Address, EPS Bearer Identity, EPS Bearer QoS, APN-AMBR, Charging ID, Cause) message to the ePDG, including the IP address(es) allocated for the UE. The P-GW selects the PDN type to be used in the same way as done during the E-UTRAN initial attach.

The PGW may initiate the creation of dedicated bearers on GTP based S2b (like it may do it on GTP based S5/S8 for an attach on 3GPP access).

E.1) Step E.1 is the same as Step E of FIG. 10, but with GTP tunnel(s).

For a data routing enhancement in un-trusted non-3GPP access, an ePDG and an entity of the 3GPP system may determine rules to determine a path of a core network in which uplink data is routed. That is, in order to adjust a load of the core network in the 3GPP system, the entity of the 3GPP system may additionally transmit following parameters to the ePDG in the initial attachment procedure described above.

3GPP core network load information

Core network routing rule: This parameter may include a 1-bit indicator indicating whether to transmit uplink data through a core network of the 3GPP system or a core network of a non-3GPP system and a transmission ratio indicating a ratio of traffic transmitted through the core network of the 3GPP system to traffic transmitted through the core network of the non-3GPP system.

That is, the entity of the 3GPP system may determine uplink data through which core network of a system in any transmission rate by taking into consideration a state of the core network of the 3GPP system and a service characteristic of traffic to be transmitted. Parameters such as the 3GPP core network load information and/or the core network routing rule may be set in the IP-CAN session establishment/modification procedure. Furthermore, parameters such as 3GPP core network load information and/or the Core network routing rule may be transmitted using a create bearer request message or an update bearer request message.

Figure 12:
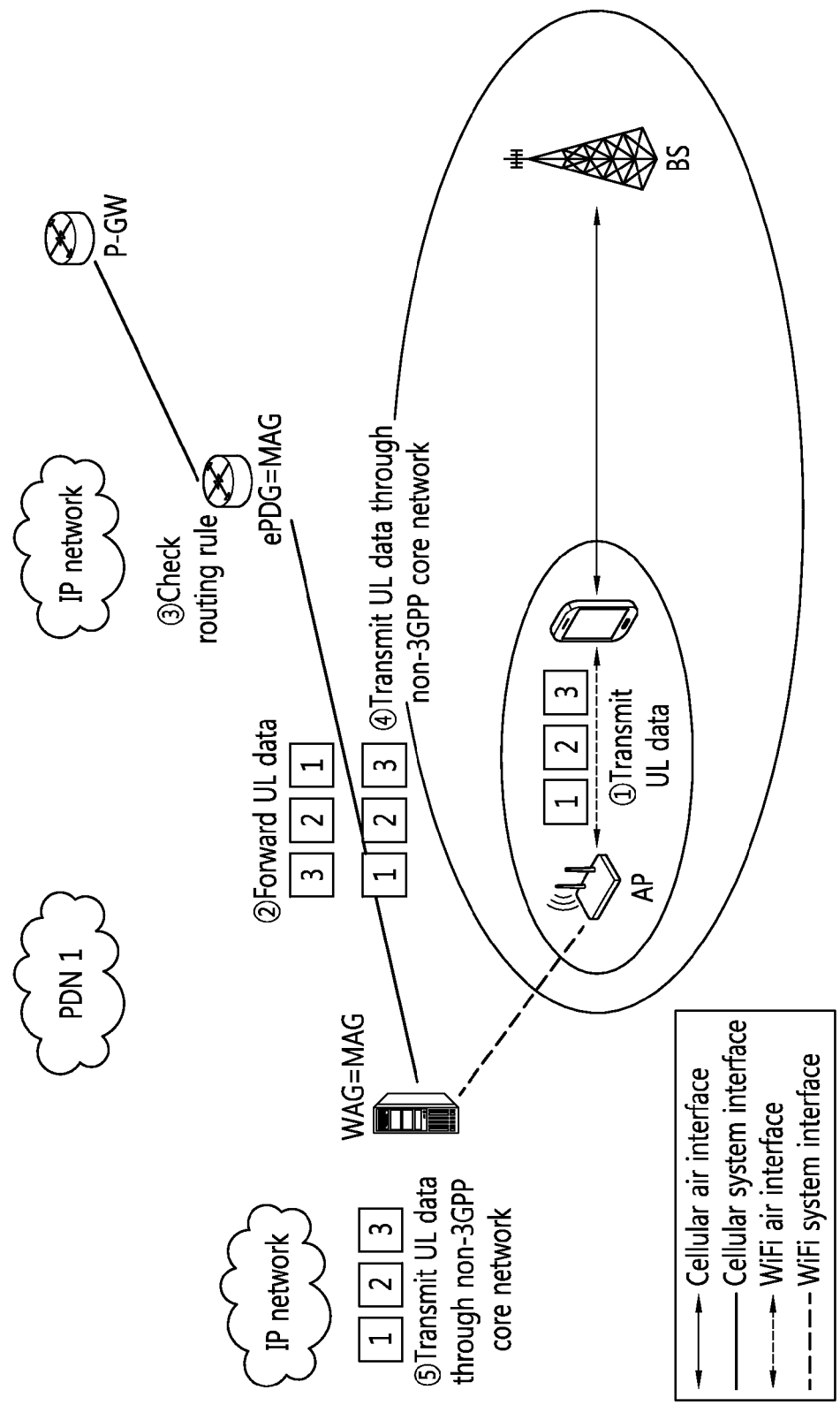
FIG. 12 shows an example of a method for routing data in un-trusted non-3GPP access according to an embodiment of the present invention.

FIG. 12 shows an example of a method for routing data in un-trusted non-3GPP access according to an embodiment of the present invention. Referring to FIG. 12, the UE transmits UL data to the WAG through the AP. The WAG forwards the received UL data to the ePDG. The ePDG operating as an MAG checks a routing rule based on parameters such as 3GPP core network load information and the core network routing rule received from the entity of the 3GPP system. The ePDG may route the UL data received based the checked routing rule. FIG. 12 shows a case where the ePDG checking the routing rule routes UL data to the core network of the non-3GPP system. The UL data routed from the ePDG is transmitted through the core network of the non-3GPP system by going through the WAG. In this case, the 1-bit indicator included in the core network routing rule parameter may indicate that the UL data are transmitted through the core network of the non-3GPP system. Meanwhile, the ePDG may transmit information on charging to the entity of the 3GPP system.

FIG. 13 shows an example of a frame structure used in a method for routing data in un-trusted non-3GPP access according to an embodiment of the present invention.

FIG. 13-(a) shows an example of a frame structure used when the UE transmits UL data to the WAG and the WAG forwards the received UL data to the ePDG. In this case, the frame includes a general IP header and an IPSec header for IP security. The IP header includes a source address set to UE 1 and a destination address set to UE 2. The IPSec header includes a source address se to the UE 1 and a destination address set to the ePDG. FIG. 13-(b) shows an example of a frame structure used when the ePDG routes the UL data. In this case, the frame includes a general IP header. The IP header includes a source address set to the UE 1 and a destination address set to the UE 1.

Figure 14:
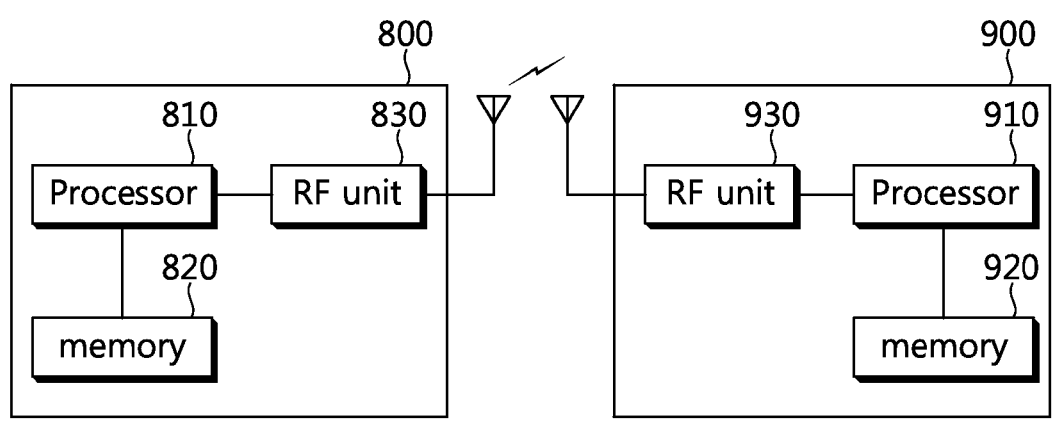
FIG. 14 shows a wireless communication system to implement an embodiment of the present invention.

FIG. 14 shows a wireless communication system to implement an embodiment of the present invention.

A WAG or ePDG 800 includes a processor 810, a memory 820, and a radio frequency (RF) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

An entity of a 3GPP system 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for routing, by a wireless local area network (WLAN) access gateway, data in a wireless communication system including trusted non-3rd Generation Partnership Project (3GPP) access, the method comprising:
   receiving uplink (UL) data;
   receiving parameters, which include 3GPP core network load information and a core network routing rule, from an entity of a 3GPP system;
   determining a path to route the UL data, through at least one of the 3GPP system and a non-3GPP system, based on the received parameters; and
   routing the UL data through at least one of the 3GPP system and the non-3GPP system,
   wherein the core network routing rule includes a 1-bit indicator indicating whether the UL data is to be transmitted through the 3GPP system or the non-3GPP system, and a transmission ratio indicating a ratio of traffic which is transmitted through the 3GPP system to traffic which is transmitted through the non-3GPP system.

2. The method of claim 1, wherein the 3GPP core network load information is included in quality of service (Qos) rules.

3. The method of claim 1, wherein the core network routing rule is included in routing rules.

4. The method of claim 3, wherein the core network routing rule is mapped with a rule identifier in the routing rules.

5. The method of claim 1, wherein the parameters are received during a gateway control session establishment procedure.

6. The method of claim 1, wherein the parameters are set during an Internet protocol (IP) connectivity access network (CAN) session establishment or modification procedure.

7. The method of claim 1, wherein the entity of the 3GPP system is a packet data network (PDN) gateway (GW).

8. The method of claim 1, further comprising:
   transmitting information on charging to the entity of the 3GPP system.

9. A method for routing, by an evolved packet data gateway (ePDG), data in a wireless communication system including un-trusted non-3rd Generation Partnership Project (3GPP) access, the method comprising:
   receiving uplink (UL) data through a wireless local area network (WLAN) access gateway;
   receiving parameters, which include 3GPP core network load information and a core network routing rule, from an entity of a 3GPP system;
   determining a path to route the UL data, through at least one of the 3GPP system and a non-3GPP system, based on the received parameters; and
   routing the UL data through at least one of the 3GPP system and the non-3GPP system,
   wherein the core network routing rule includes a 1-bit indicator indicating whether the UL data is to be transmitted through the 3GPP system or the non-3GPP system, and a transmission ratio indicating a ratio of traffic which is transmitted through the 3GPP system to traffic which is transmitted through the non-3GPP system.

10. The method of claim 8, wherein the parameters are received during an initial attachment procedure.

11. The method of claim 8, wherein the parameters are set during an Internet protocol (IP) connectivity access network (CAN) session establishment or modification procedure.

12. The method of claim 8, wherein the entity of the 3GPP system is a packet data network (PDN) gateway (GW).

13. The method of claim 8, further comprising:
   transmitting information on charging to the entity of the 3GPP system.

* * * * *